: US008446362B2

United States Patent
Gu

(10) Patent No.: US 8,446,362 B2
(45) Date of Patent: May 21, 2013

(54) HAND-SHAPED MOUSE

(75) Inventor: Qun Gu, Shanghai (CN)

(73) Assignees: Inventec Appliances (Shanghai) Co. Ltd., Shanghai (CN); Inventec Appliances Corp., Taipei County (TW)

( * ) Notice: Subject to any disclaimer, the term of this patent is extended or adjusted under 35 U.S.C. 154(b) by 211 days.

(21) Appl. No.: 13/030,934

(22) Filed: Feb. 18, 2011

(65) Prior Publication Data
US 2011/0210919 A1  Sep. 1, 2011

(30) Foreign Application Priority Data

Feb. 26, 2010  (CN) .......................... 2010 1 0114184

(51) Int. Cl.
  *G09G 5/00* (2006.01)
  *G09G 5/08* (2006.01)
  *G06F 3/033* (2006.01)
(52) U.S. Cl.
  USPC ......................................... 345/156; 345/163
(58) Field of Classification Search
  None
  See application file for complete search history.

(56) References Cited

U.S. PATENT DOCUMENTS

| 5,340,067 | A  | * | 8/1994  | Martin et al. | 248/118.5 |
|---|---|---|---|---|---|
| 6,377,245 | B1 | * | 4/2002  | Park | 345/163 |
| 6,441,805 | B1 | * | 8/2002  | Reid et al. | 345/163 |
| 2001/0021332 | A1 | * | 9/2001  | Boldy et al. | 400/489 |
| 2003/0098851 | A1 | * | 5/2003  | Brink | 345/163 |
| 2004/0012568 | A1 | * | 1/2004  | Velikov et al. | 345/163 |
| 2005/0030278 | A1 | * | 2/2005  | Fu | 345/156 |
| 2005/0030288 | A1 | * | 2/2005  | Johnson | 345/167 |
| 2005/0083297 | A1 | * | 4/2005  | Duncan | 345/156 |
| 2006/0007149 | A1 | * | 1/2006  | Miller | 345/163 |
| 2006/0007152 | A1 | * | 1/2006  | Wang | 345/163 |
| 2006/0176277 | A1 | * | 8/2006  | Daniel et al. | 345/163 |
| 2008/0259026 | A1 | * | 10/2008 | Zeldin et al. | 345/157 |
| 2010/0171701 | A1 | * | 7/2010  | Wu | 345/163 |
| 2012/0172729 | A1 | * | 7/2012  | Yi et al. | 600/483 |

\* cited by examiner

*Primary Examiner* — Amare Mengistu
*Assistant Examiner* — Antonio Xavier
(74) *Attorney, Agent, or Firm* — WPAT, P.C.; Anthony King

(57) ABSTRACT

A mouse is disclosed that comprises a main body, at least one function key, a position sensor and a data transmission line. The main body has a hand-shaped groove, a first surface disposed at a bottom of the hand-shaped groove, and a reverse surface to the first surface. The at least one function key is disposed on the first surface for producing at least one function signal. The position sensor is disposed on the reverse surface for sensing movement of the main body to produce a position signal. And the data transmission line is coupled to the main body for transmitting the function signal and the position signal to an electronic system or apparatus for operating the electronic system or apparatus.

9 Claims, 2 Drawing Sheets

HAND-SHAPED MOUSE

BACKGROUND OF THE INVENTION

1. Field of the Invention

The present invention relates to a mouse, and more particularly to a mouse capable of reducing fatigue and preventing injuries of a user's hand muscles.

2. Description of the Related Art

As information technologies advance rapidly in recent years, information products such as mobile phones, computers, and personal digital assistants become very popular and meet the requirements of our daily life, and thus people rely on information products more increasingly, and the information products are indispensible to our daily life.

In general, users use a keyboard and a mouse to execute computer application programs, and the mouse is a necessary peripheral device for users to control the movement of a cursor on a computer screen and press a function key of the mouse to control and click a control object in order to execute a corresponding application program.

However, the design of a present existing mouse usually requires a user to hold the mouse by an arch-shaped hand, such that the user's hand is suspended. In other words, there is a gap between the user's hand and the main body of the mouse. After a long time of use of the mouse, the user's hand muscle will be fatigue or even injured.

SUMMARY OF THE INVENTION

Therefore, it is an objective of the invention to provide a mouse for effectively reducing fatigue and preventing injuries to a user's hand muscles after a long time of use of the mouse.

The mouse of the present invention comprises a main body, at least one function key, a position sensor and a data transmission line. The main body has a hand-shaped groove, a first surface at a bottom of the hand-shaped groove, and a reverse surface to the first surface. The at least one function key is disposed on the first surface for producing at least one function signal. The position sensor is disposed on the reverse surface for sensing a moving direction of the main body to produce a position signal. The data transmission line is coupled to the main body for transmitting the function signal and the position signal to an electronic system or apparatus (such as a computer) to operate the electronic system or apparatus.

In a preferred embodiment of the present invention, the hand-shaped groove has a palm accommodating portion and five finger accommodating portions. The first surface is substantially planar, and the five finger accommodating portions are respectively connected to the palm accommodating portion, and the at least one function key is disposed under at least one of the finger accommodating portions.

In a preferred embodiment of the present invention, each function key comprises a first function button, a second function button or a scroll button disposed under three of the five finger accommodating portions respectively.

In a preferred embodiment of the present invention, three of the function keys comprise a first function button, a second function button and a scroll button respectively. The first function button is disposed under one of the five finger accommodating portions corresponding to the index finger, and the second function button is disposed under one of the five finger accommodating portions corresponding to the little finger, and the scroll button is disposed under one of the five finger accommodating portions corresponding to the middle finger.

In a preferred embodiment of the present invention, the position sensor comprises an optical sensor or a sensor having a rolling ball.

In a preferred embodiment of the present invention, the data transmission line comes with a universal serial bus (USB) interface or a connector.

The main body of the mouse in accordance with the present invention has a hand-shaped groove, so that when the user operates the mouse, the user can stretch out the hand flatly into the hand-shaped groove to operate the mouse without arching the hand for the operation of the mouse, so as to reduce fatigue and prevent injuries to the user's hand muscles after a long use of the mouse.

The aforementioned characteristics and advantages of the present invention will become apparent with the detailed description of the preferred embodiments together with related drawings as follows.

DETAILED DESCRIPTION OF THE PREFERRED EMBODIMENTS

The technical measures used in the present invention to achieve the foregoing objectives and effects will become apparent in view of the detailed description of preferred embodiments, together with the accompanying drawings, as follows.

Figure 1:
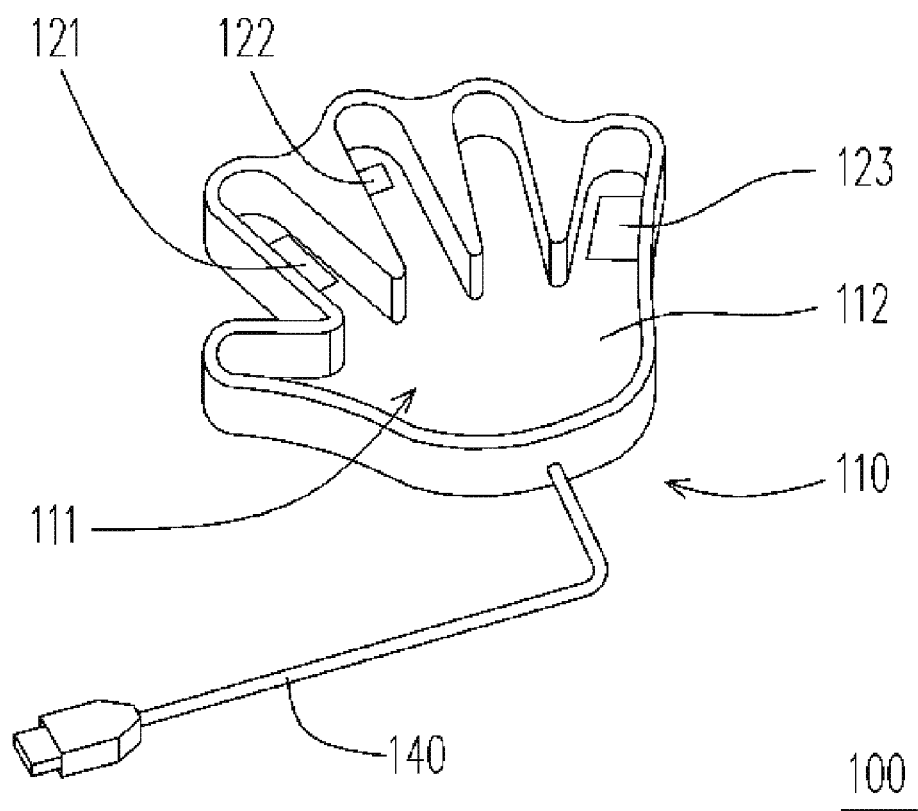
FIG. 1 is a schematic view of a mouse in accordance to a preferred embodiment of the present invention.
Figure 2:
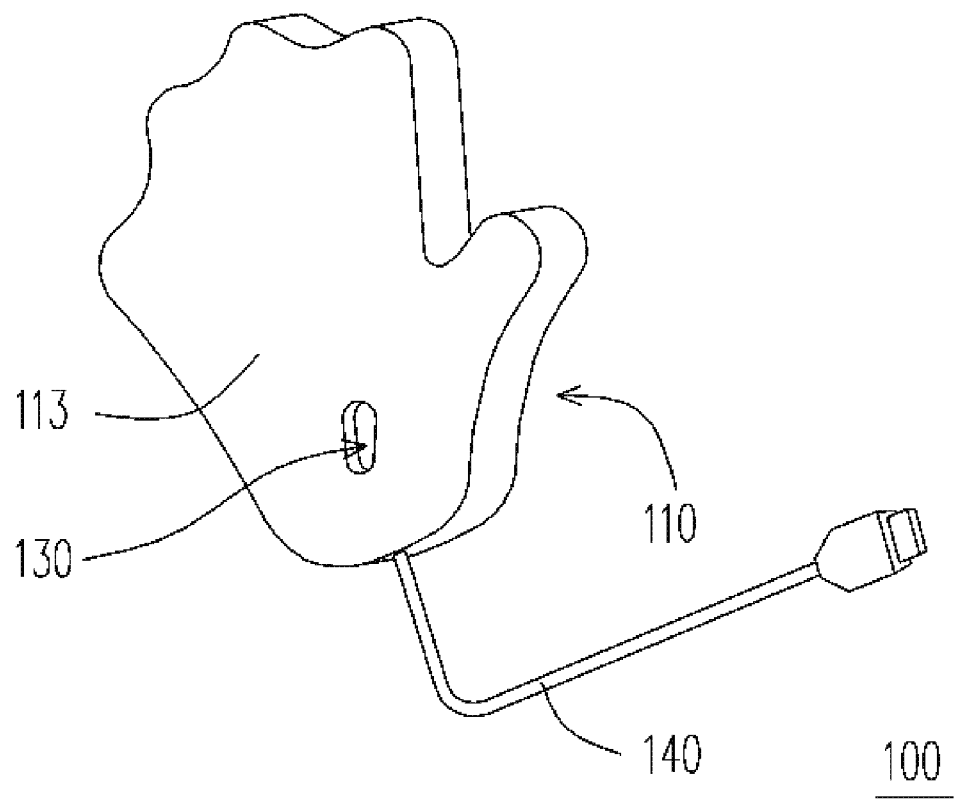
FIG. 2 is a schematic view of the mouse as depicted in FIG. 1 and viewed from another angle.

With reference to FIG. 1 showing a schematic view of a mouse in accordance to a preferred embodiment of the present invention and FIG. 2 showing a schematic view of the mouse depicted in FIG. 1 and viewed from another angle, the mouse 100 comprises a main body 110, at least one function key, a position sensor 130 and a data transmission line 140.

The main body 110 has a hand-shaped groove 111, a first surface 112 at a bottom of the hand-shaped groove 111, and a reverse surface 113 to the first surface 112. A user's hand can be stretched out and placed flatly into the hand-shaped groove 111 of the main body 110 to operate the mouse 100. In this preferred embodiment, the main body 110 is in the shape of a hand, but the present invention is not limited to such arrangement only.

The at least one function key can include a first function button 121, a scroll button 122 and a second function button 123, which are disposed on the first surface 112 for producing at least one function signal corresponding to at least one function. It is noted that the at least one function key may produce the at least one function signal. In this preferred embodiment, the first function button 121 can be a left function key of a general mouse, the scroll button 122 can be a roller of a general mouse, the second function button 123 can be a right function key of a general mouse. Therefore, a user can use the function keys 121, 122, 123 to control the mouse 100 for operations such as selecting an object on a computer screen in the same way as a general mouse, scrolling a webpage or long file and opening a menu.

The position sensor 130 is disposed on the reverse surface 113 for sensing movement of the main body 110 to produce a position signal. It is noted that the position sensor 130 may for example senses movement of the main body 110 to produce the position signal. In this preferred embodiment, the position sensor 130 can be an optical sensor or a sensor having a roller for sensing the movement of main body 110 through the reflection of a sensing light or the movement of a roller to control and move a cursor on a computer screen.

The data transmission line 140 is coupled to the main body 110 for transmitting the function signal produced by the function key (such as the first function button 121, scroll button 122 and second function button 123) and the position signal produced by the position sensor 130 to an electronic system or apparatus such as a computer (not shown in the figure) for operating the electronic system or apparatus. It is noted that the data transmission line 140 may transmit the function signal and the position signal to the electronic system or apparatus for operating the electronic system or apparatus. In this preferred embodiment, the data transmission line 140 can be a data transmission line with a universal serial bus (USB) interface or a connector.

In this preferred embodiment, the hand-shaped groove 111 has a palm accommodating portion and five finger accommodating portions, and the first surface is substantially planar, and the five finger accommodating portions are connected to the palm accommodating portion to form the hand-shaped groove 111. The first function button 121 (such as the left function key of a general mouse) can be disposed under one of the five finger accommodating portions corresponding to the index finger; the scroll button 122 (such as the roller of a general mouse) can be disposed under one of the five finger accommodating portions corresponding to the middle finger; and the second function button 123 (such as the right function key of a general mouse) can be disposed under one of the five finger accommodating portions corresponding to the little finger. Therefore, the user can perform related operations of the mouse 100 through the foregoing function keys 121, 122, 123.

In addition, the first surface 112 and the reverse surface 113 can be planar surfaces, so that a user's hand can be stretched to and placed flatly on the first surface 112 (which is the bottom of the hand-shaped groove 111 of the main body 110), and the reverse surface 113 can be attached onto a desk top and moved freely. The user can operate the mouse 100 comfortably without the need of arching the hand, so as to reduce fatigue and prevent injuries to the user's hand muscles after a long time of use of the mouse 100.

However, the function keys 121, 122, 123 of the foregoing preferred embodiment are disposed under three of the five finger accommodating portions corresponding to the index, middle finger and little finger respectively. The present invention is not limited to such arrangement only, but the function keys 121, 122, 123 can be disposed under three of the five finger accommodating portions respectively according to the user requirement.

In summation of the description above, the main body of the mouse in accordance with a preferred embodiment of the present invention has a hand-shaped groove, and the bottom of the hand-shaped groove is a planar surface, so that when the user operates the mouse, the user's hand can be stretched out and placed flatly in the hand-shaped groove to operate the mouse without the need of arching the hand to operate the mouse, so as to reduce fatigue and prevent injuries to the user's hand muscles after a long time of use of the mouse.

While the invention has been described by means of specific embodiments, numerous modifications and variations could be made thereto by those skilled in the art without departing from the scope and spirit of the invention set forth in the claims.

What is claimed is:

1. A hand-shaped mouse, comprising:
    a main body having a hand-shaped groove, a first surface at a bottom of the hand-shaped groove and a reverse surface to the first surface;
    at least one function key disposed on the first surface for producing at least one function signal corresponding to at least one function;
    a position sensor disposed on the reverse surface for sensing movement of the main body to produce a position signal; and
    a data transmission line coupled to the main body for transmitting the function signal and the position signal to an electronic system or apparatus for operating the electronic system or apparatus;
    wherein the first surface is substantially planar.

2. The hand-shaped mouse of claim 1, wherein the hand-shaped groove has:
    a palm accommodating portion; and
    five finger accommodating portions respectively connected to the palm accommodating portion, the at least one function key being disposed under at least one of the five finger accommodating portions.

3. The hand-shaped mouse of claim 2, wherein each function key comprises a first function button, a second function button or a scroll button, disposed under three of the five finger accommodating portions respectively.

4. The hand-shaped mouse of claim 3, wherein the scroll button has a scroll wheel.

5. The hand-shaped mouse of claim 2, with three of the function keys comprising a first function button, a second function button and a scroll button respectively, wherein the first function button is disposed under one of the five finger accommodating portions corresponding to the index finger, the second function button is disposed under one of the five finger accommodating portions corresponding to the little finger, and the scroll button is disposed under one of the five finger accommodating portions corresponding to the middle finger.

6. The hand-shaped mouse of claim 5, wherein the scroll button has a scroll wheel.

7. The hand-shaped mouse of claim 1, wherein the position sensor comprises an optical sensor or a sensor having a rolling ball.

8. The hand-shaped mouse of claim 1, wherein the data transmission line has a universal serial bus interface or a connector.

9. The hand-shaped mouse of claim 1, wherein the electronic system or apparatus comprises a computer.

* * * * *